United States Patent [19]

Oosterling et al.

[11] 4,238,917

[45] Dec. 16, 1980

[54] MOWING DEVICE

[75] Inventors: Pieter A. Oosterling; Hendricus C. Van Staveren, both of Nieuw-Vennep, Netherlands

[73] Assignee: Vicon N.V., Nieuw-Vennep, Netherlands

[21] Appl. No.: 93,679

[22] Filed: Nov. 13, 1979

Related U.S. Application Data

[63] Continuation of Ser. No. 870,208, Jan. 17, 1978, abandoned.

[30] Foreign Application Priority Data

Jan. 19, 1977 [NL] Netherlands .................. 7700541
Nov. 7, 1977 [NL] Netherlands .................. 7712265

[51] Int. Cl.³ ............................................. A01D 57/20
[52] U.S. Cl. ........................................ 56/192; 56/295
[58] Field of Search ............... 56/192, 295, 344–352, 56/364

[56] References Cited

U.S. PATENT DOCUMENTS

| 2,381,620 | 8/1945 | Russell | 56/344 |
| 3,772,865 | 11/1973 | Ruprecht et al. | 56/192 |

Primary Examiner—Robert A. Hafer
Attorney, Agent, or Firm—John P. Snyder

[57] ABSTRACT

In order to prevent the adhesion of crop to a swath board of a mowing device, the or each swath former comprises an endless member passed around a foremost and a hindmost reversing element, viewed in the direction of movement, the crop advancing run of said member being at an acute angle to the carrier.

19 Claims, 8 Drawing Figures

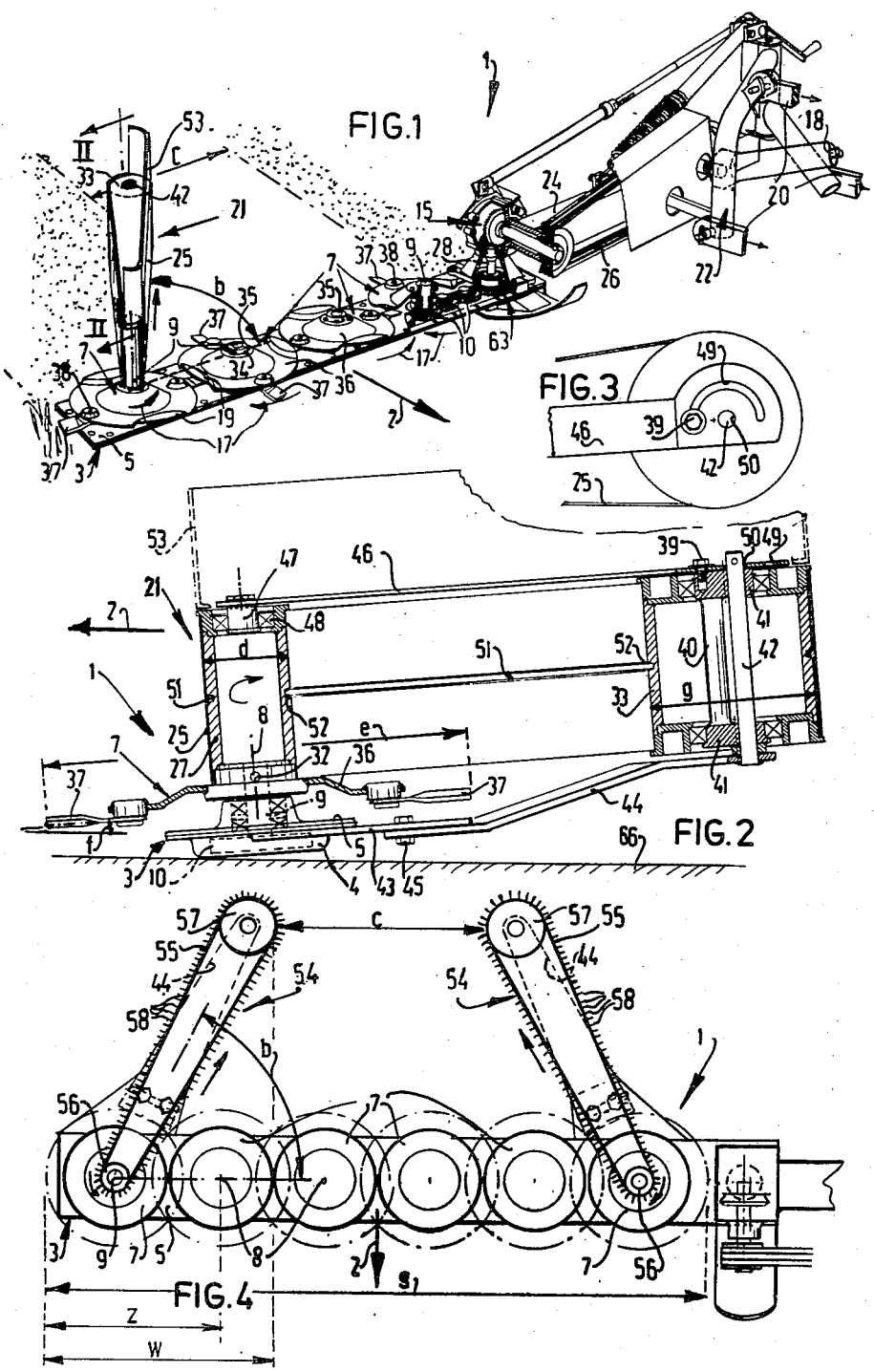

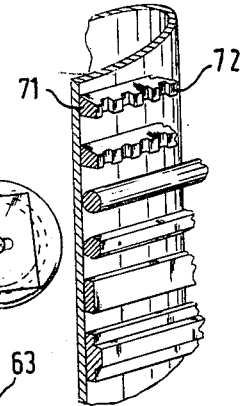
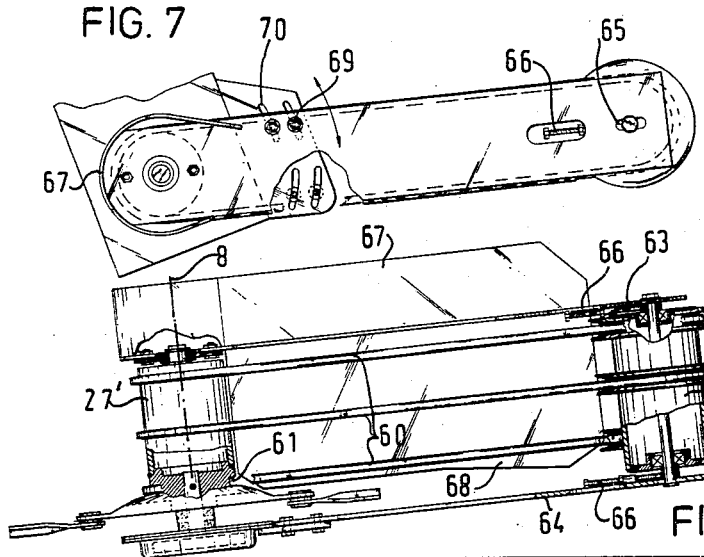
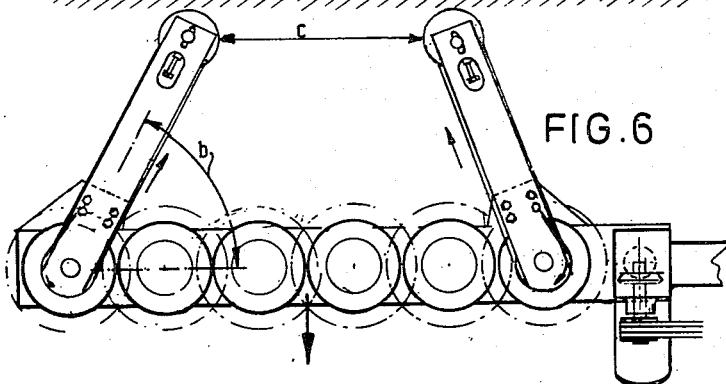

MOWING DEVICE

This is a continuation, of application Ser. No. 870,208 filed Jan. 17, 1978, now abandoned.

The invention relates to a mowing device comprising an elongated carrier extending transversely of the direction of movement of the mowing device for a plurality of rotatably driven cutting members having each at least one cutter fastened to the periphery thereof, whilst a swath former is provided at least at one of the two ends of the mowing device.

Such a mowing device is known.

The swath former thereof consists of a drum driven by an outermost cutting member and a swath board arranged behind the same. Sometimes this swath former does not operate satisfactorily. If the crop is sticky, it tends to adhere to the swath board. The quantity of crop sticking to the swath board rapidly increases so that the mowing process has to be repeatedly interrupted for removing all crop from the swath board. In some cases a swath is formed, which is not sufficiently narrow for being handled, for example, by a pick-up wagon or baler following the mower.

The invention has for its object to reduce the number of interruptions of the mowing process and provides to this end a mowing device which is distinguished in that the or each swath former comprises an endless member passed around a foremost and a hindmost reversing element, viewed in the direction of movement, the crop advancing run of said member being at an acute angle to the carrier.

In a first embodiment the endless member is formed in accordance with the invention by a flexible belt and in a further embodiment the endless member may be formed by more than one flexible rope.

For both embodiments the invention proposes steps for preventing the adhesion of crop to the endless member.

The above-mentioned and further features of the invention will become evident from the following description of a few embodiments of a mowing device in accordance with the invention.

In the drawing

FIG. 1 is a perspective view, partly broken away, of a mowing device embodying the invention, FIG. 2 is an enlarged sectional view taken on the line II—II in FIG. 1, FIG. 3 is a plan view, partly broken away, of a portion of said mowing device on an enlarged scale, FIG. 4 is a plan view of a further embodiment of the device in accordance with the invention, FIG. 5 is a partially broken away side elevation of a swath former in a mowing device of FIG. 1 in a second further embodiment, FIG. 6 is a plan view like FIG. 4 of a mowing device with the swath former of FIG. 5, FIG. 7 is an enlarged part of the plan view of FIG. 6, and FIG. 8 is a perspective view and partly a sectional view of various embodiments of rope-like endless members.

Referring to FIG. 1 the mowing device 1 is attached by means of an auxiliary frame 24 to a framework 22 attached to the hitch rods 20 of a tractor (not shown) and is driven through a bevel pinion driving gear 15 and a belt drive 26 via a universal shaft 18 by a power take-off shaft of the tractor.

The mowing device 1 according to the invention comprises a carrier 3 extending transversely of the direction of movement 2 of the device and formed by a flat, elongated housing mainly comprising a trough 4 and a cover 5 secured thereto. On the housing 3 are journalled a plurality of cutting members 7 so as to be rotatable about upwardly extending axes 8. The cutting members 7 are disposed near and above the housing 3 and are adapted to rotate pairwise in opposite senses 17. Each cutting member 7 is rigidly secured by a shaft 9 to a pinion 10 of a driving gear 63 accommodated in the housing 3 and comprising a sequence of pinions 10, being driven through a shaft 28 by the bevel pinion gear 15.

The shaft 9 of each cutting member 7 is rotatably journalled in an upright collar 31 of the cover 5 by means of a bearing 30.

Each cutting member 7 comprises a disc 36 secured by screws 34 to a hub 35 and at least one, for example, two cutters 37 secured to the periphery of the disc 36. The cutters 37 move past beneath the neighbouring discs 36 without touching them, for which purpose the discs 36 have upwardly extending bulging parts 19. The cutters 37 of neighbouring cutting members 7 are relatively off-set through an angle of 90° so that they do not touch one another, though the cutter paths overlap one another. Each cutter 37 is freely rotatable about a pin 38.

The mowing device 1 has a low structure throughout the working width and the shape of the cutting members 7 is such that the mower 1 can readily pass beneath the cut crop. The circumferential speed of the cutters 37 is very high, for example, about 80 ms/sec with a circumferential diameter e of 45 to 50 cms.

During the mowing operation the mowing device 1 is held in a position leaning slightly forwards so that the cutting members 7 are at an angle f relative to the ground surface 66.

The device shown in FIG. 1 comprises at one of its two ends, that is to say, at the end remote from the auxiliary frame 24, a swath former 21 comprising an endless flexible belt 25, which extends around a foremost reversing roller 27 and a hindmost roller 33. The hindmost roller 33 is journalled on a shaft 40, supported by two collars 41 of which are adapted to turn about an eccentric pin 42 carried by an auxiliary frame formed by rods 46, 44, the latter pivotally connected with an extension arm 43 of the housing 3 and secured thereto by two bolts 45 lying in a slot, said auxiliary frame engaging through a stub shaft 47 and a bearing 48 the foremost roller 27 and through a bolt 39 in a curved slot 49 a collar 41 and through a hole 50 the pin 42. By said means the angle of deflection b of the swath former 21 and hence the width c of the swath as well as the tension of the endless belt 25 can be adjusted.

The foremost roller 27 may be freely rotatable on an outermost cutting member 7, whilst the hindmost roller 33 may be driven, as the case may be. However, it is preferred to couple the foremost roller 27 rigidly with the outermost cutting member 7, for example, by connecting the reversing roller 27 with the shaft 9 by a transverse pin 32. In order to ensure a low travelling speed of the endless belt 25, the diameter d of the driven, foremost roller 27 is small, for example, 10 to 15 cms, whereas the diameter g of the hindmost roller 33 is larger.

In order to ensure a suitable guide and a substantially slip-free drive of the endless belt 25 a V-belt 51 may be fastened to its inner side, said belt engaging a circumferential groove 52 of each of the rollers 27 and 33.

As the case may be, a shoulder 53 rigidly secured to the rod 46 may be provided above the endless belt 25.

With a large working width s the mowing device 1 permits of obtaining nevertheless a comparatively small width c of the swath.

Instead of driving the endless belt 25 by means of a roller 27 fastened to the outermost cutting member 7, the roller 27 may be driven by the cutting member 7 via a gear reduction member or the belt 25 may be driven by means of the hindmost roller 33. The belt 25 may then be driven with a lower circumferential speed more satisfactorily adapted to the intended use i.e. the formation of a most regular swath.

The embodiment of the mowing device 1 shown in FIG. 4 comprises a swath former 54 according to the invention at each of the two ends. Each of the swath formers 54 comprises a plurality of flexible members in overlying positions formed by endless chains 55 passed around rollers formed by chain sprockets 56 and 57. The chains 55 are provided on the outside with crop catches 58.

Between the two outermost cutting members 7, to which the rollers (chain sprockets 56) are fastened, the mowing device 1 shown in FIG. 4 comprises a plurality of cutting members formed by low cutting discs. The mowing device 1 may, however, as an alternative have only two cutting members 7 rotating in opposite senses and consisting each of a drum-shaped, foremost roller and an annular collar fastened to the bottom side thereof and carrying one or more cutters.

FIG. 5 shows a third embodiment of the endless member forming a swath former. This endless member comprises three parallel belts 60 in overlying positions, each belt being passed around a foremost roller 27 having an associated circumferential groove 61, only the lower one being shown. The belts are also passed around a hindmost roller 33, the associated circumferential grooves being defined on either side of the belt 60 by flanges 62 so that the belt 60 is completely located within the outer circumference of the element. This structure ensures that at the front of the mowing device the cut crop is effectively engaged and loosened respectively at the hindmost reversing roller 33.

A further distinction resides in that the hindmost roller 33 is carried in an auxiliary frame comprising an upper plate 63 and a bottom plate 64, whilst through an elongated hole 65 and a set bolt 66 the hindmost reversing roller can be displaced so that the tension of the belts 60 can be adjusted. Like in the preceding embodiment the foremost reversing roller 27 of this embodiment is driven by the outermost cutting member 7.

Along an edge of the upper plate 63 a guide plate 67 corresponding to the plate 53 of FIG. 2 is provided and bent over at the front concentrically with the foremost reversing element 27 (see FIG. 7). On the rear side of the advancing run of the belts a guide plate 68 extends between the elements 27 and 33 respectively.

The auxiliary frame is pivotable about the rotary axis 8 of the associated cutting disc and arranged on the housing, whilst the angle b (see FIG. 6) can be adjusted by means of a plurality of clamping bolts 69 which extend through elongated holes 70 in a plate of the housing.

The mode of operation and the function of the device shown in FIGS. 5 to 7 correspond with those of the device of FIGS. 1 to 4.

FIG. 8 shows various embodiments of belts 60. In a preferred embodiment the belt has a cross-section narrowing from its supporting surface 71 towards the outside (see the two upper and lower embodiments respectively in FIG. 8), which ensures an effective disengagement of the crop in the area of the circumferential grooves in the reversing elements.

The two upper embodiments of belts in FIG. 8 are furthermore provided with extensions 72 corresponding to the crop catching members 58 of FIG. 4 on the side remote from the supporting surface 71.

The invention is not limited to the embodiments shown. The endless members may, as an alternative, be formed by other elements than flexible members. It may be imagined to use chains of conventional shape or other pivotable, endless conveying elements.

It should be noted that the swath formers of the mowing device may be arranged pairwise to form more than one swath. Each flexible endless swath member 25 can be positioned and fixed by means of said clamping bolts 69 in such position that the endless member 25 extends inwardly over the distance w from the end of the mower, which distance w is greater than the distance z at which the axis of the outermost but one cutting member is spaced from said end. The reversing elements 27 and 33 are cylindrical and extend parallel.

What we claim is:

1. A mowing device comprising, in combination:
   a horizontally elongate carrier and mounting means for attaching the carrier to a vehicle such that the carrier may be moved over the field in the direction of movement while extending transversely of the direction of such movement;
   cutting means carried by said carrier for cutting at least one crop swath having a width greater than the width of a desired windrow; and
   crop deflecting means connected to said carrier for conforming said one swath to the desired windrow width, said crop deflecting means comprising at least one endless flexible member, spaced guide means about which said endless member is trained, and drive means for driving said endless member, said guide means comprising first and second elements, the first element being disposed adjacent said carrier and being rotatable about a generally upright axis and the second element being disposed in trailing, laterally offset relation to said first element and being rotatable about an axis substantially parallel with said generally upright axis, the offset relation of said second element being such as to position a flight of said endless member at an acute angle with the longitudinal axis of said carrier, and the axes of said elements during operation being disposed in fixed relation with respect to each other.

2. A mowing device as defined in claim 1 wherein said elements include substantially cylindrical surface portions upon which said endless member is engaged.

3. A mowing device as defined in claim 1 wherein said acute angle is adjustable.

4. A mowing device as claimed in claim 3 wherein the second element is mounted for rotation on a subframe extending between the first and second element, said subframe being swingable with respect to said carrier about the axis of rotation of said first element between at least two different operation positions and being connectable to said carrier in said at least two positions.

5. A mowing device as claimed in claim 2, characterized in that the endless member is formed by a flexible, flat belt.

6. A mowing device as claimed in claim 5, characterized in that at least one of the elements is formed by a roller having one or more circumferential grooves, an elevation on the inner side of the flat belt fitting in each groove.

7. A mowing device as claimed in claim 2 wherein the second element is mounted for rotation on a subframe extending between the first and second element, said subframe being swingable with respect to said carrier about the axis of rotation of said first element between at least two different operation positions and being connectable to said carrier in said at least two positions.

8. A mowing device as claimed in claim 1, characterized in that the endless member is formed by more than one flexible belt.

9. A mowing device as claimed in claim 8, characterized in that the or each rope around the first element projects from the circumference thereof.

10. A mowing device as claimed in claim 9, characterized in that the or each rope around the second element is located inside the circumference thereof.

11. A mowing device as claimed in claim 8 characterized in that each belt is guided in a circumferential groove of the first and second elements, whilst from the supporting surface in the groove each belt has a cross-section narrowing towards the outside.

12. A mowing device as claimed in claim 8, characterized in that behind the advancing run of the endless member a fixed guide member is arranged between the elements.

13. A mowing device as claimed in claim 1, characterized in that the second element is journalled on a standing shaft supported by an auxiliary frame pivoted to the carrier.

14. A mowing device as claimed in claim 1, characterized in that at least one of the elements is supported by an eccentrically displaceable bearing.

15. A mowing device as claimed in claim 1, characterized in that the endless member is provided with crop catches.

16. A mowing device as claimed in claim 1, characterized by swath formers arranged pairwise and formed by endless members passed around first and second elements.

17. A mowing device as defined in claim 5 wherein both elements are in the form of generally cylindrical rollers, the diameter of said second element being greater than the diameter of said first element.

18. A mowing device as claimed in claim 1 wherein the distance between the first and second element is adjustable.

19. A mowing device as defined in claim 18 wherein said acute angle is adjustable.

* * * * *